A. STOMBAUGH.
CHICKEN ROOST.
APPLICATION FILED JULY 7, 1909.
995,734.
Patented June 20, 1911.
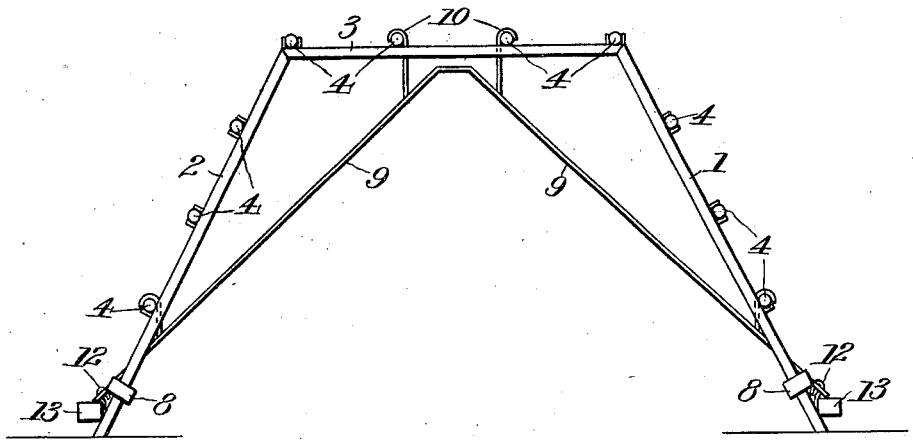
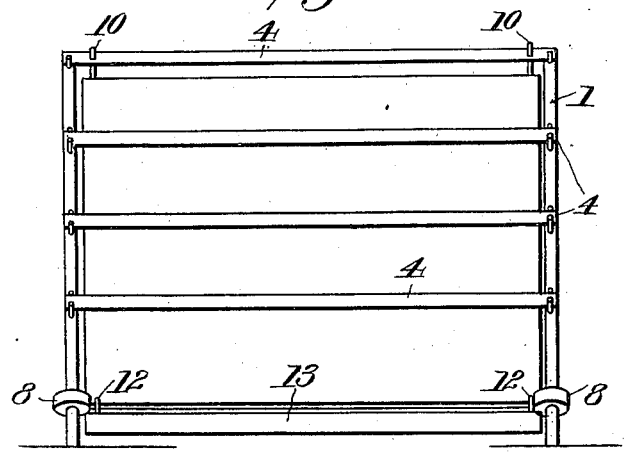
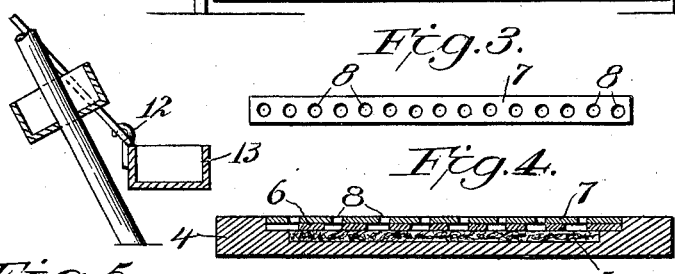
Witnesses
Inventor
Arch Stombaugh
Frank Fuller
Attorney

UNITED STATES PATENT OFFICE.

ARCH STOMBAUGH, OF EARL, NEBRASKA.

CHICKEN-ROOST.

995,734.  Specification of Letters Patent. Patented June 20, 1911.

Application filed July 7, 1909. Serial No. 506,401.

*To all whom it may concern:*

Be it known that I, ARCH STOMBAUGH, citizen of the United States, residing at Earl, in the county of Frontier and State of Nebraska, have invented certain new and useful Improvements in Chicken-Roosts, of which the following is a specification.

My invention relates to new and useful improvements in roosts for chickens and other fowls, and the objects of the same are to provide an economical, convenient, collapsible roost for fowls, and one that is easily adjusted and may be conveniently removed from place to place or folded and stored in a limited space. And a further object is to provide a sanitary roost, with offal receiving and dumping pans, and safe and efficient insecticide receptacles, which can be regulated in the discharge of vermin destroying odors and material, and which can be used without injurious effects on the fowls. With these objects in view, and others which will appear from the specification and claims filed herein, I declare the following to be a clear and exact description of my invention, so that those skilled in the art to which it relates, may make and use the same, reference being had to the accompanying drawings, which form a part hereof.

Similar numerals of reference are employed to indicate corresponding parts in the several views, in which, Figure 1, is an end elevation of my invention ready for use. Fig. 2, is a side elevation of the same. Fig. 3, is a plan view, in detail, of the perch groove slide. Fig. 4, is a sectional view of the perch, showing the groove and slides. Fig. 5 is a sectional end view of the dumping pan and insecticide cup.

Referring specifically to the drawings, 1, 2 and 3, are three members comprising a skeleton frame; 1 and 2 are pivoted or hinged at their upper ends to cross member 3, at its extremities, 1 and 2 forming inclined supports and 3 a transverse top connecting member. The side and top members, 1, 2 and 3, have extending across at suitable intervals, a series of movable connecting perches, 4, with extremities resting on the said members, in supporting contact with the frame. These perches 4, are each provided with longitudinal grooves 5, extending substantially their length, and inclosed with movable plate 6, preferably metallic, which is provided with a series of apertures, extending its entire length. Coacting with plate 6, and loosely mounted thereon, is a slide, 7, provided with apertures, at 8, similar to those in the corresponding plate 6 inclosing the groove 5. The groove 5, in the perch, is adapted to receive a suitable absorbent material, such as wicking and the like, saturated with any of the usual insecticides or disinfectants, or insect powder may be used in the absence of saturating material. When the insecticide or disinfectant is placed in the groove 5, the plate 6 is adjusted over the groove and slide plate 7, and the odor penetrates the apertures in the two plates, and can be controlled in quantity or supply by the plates 6 and 7 being adjusted in such manner as to bring the apertures of these two plates in a desired position; if a full and free supply is wanted, the operator moves the plate 7 in such position as to bring the apertures in that plate immediately opposite those in plate 6, and if a small supply is desired, or the whole supply shut off, the plates may be adjusted for this purpose.

This novel construction presents advantages over the present methods as there is no danger of wasting or spilling the material, or the fowls accidentally consuming the poison mixture; the supply and consumption of the mixture can be easily regulated to correspond with the conditions of the inclosure or atmospheric conditions, and it is safer, healthier and more economical.

8—8 are cups rigidly secured to and surrounding the ground ends of frames 1 and 2, and are thus arranged as a receptacle for insecticide, to prevent insects from ascending the frame work from the ground or floor. They are placed above the ground for cleanliness, safety to the fowls and convenience in handling.

9—9 are dropping pans, preferably made of metal, and are of suitable dimensions when adjusted in approximately a triangular shape, to receive the droppings of the entire roost when in use. The point of the angle when in use, extends in proximity to the top of the perches, preventing the fowls from roosting on them. These dropping pans are provided with lateral hooks, at 10, for the purpose of attachment to the perches at the top, and at 11 with similar hooks for attachment to the bottom perches, holding them in position when in use as herein described.

At the bottom, or ground side of the pans, 9—9, when in use, are conveniently adjusted by means of hooks 12—12, dumping pans, as at 13, which extend across the entire bottom portion of the dropping pans, and are provided as receptacles for the offal as it descends the inclined dropping pans, 9—9. These dumping pans, as at 13, are conveniently separated from the dropping pans, 9—9, by releasing the hooks 12—12, allowing them to be easily cleaned and dumped.

It is obvious from this detailed description, that the very highest sanitary conditions are secured by my invention, as the perches, frame and all parts, may be separated from each other for cleansing and deodorizing purposes, and at the same time the various sections may be conveniently stored in a very small space.

Having described my invention what I claim as new is;—

1. A roost of the character described consisting of perches having longitudinal insecticide grooves and coacting perforated covers slidably mounted therein, substantially as set forth.

2. The herein described roost comprising a bar provided with longitudinal insecticide grooves and perforated covers therefor, adaptable to movable adjustment therein to control the egress of the fumes of the material required in the use of said roost, substantially as set forth.

In testimony whereof I affix my signature in presence of two witnesses.

ARCH STOMBAUGH.

Witnesses:
    JAMES P. TIBBETTS,
    RICHARD PULS.

Copies of this patent may be obtained for five cents each, by addressing the "Commissioner of Patents, Washington, D. C."